July 14, 1959     L. G. SIMJIAN     2,894,753
INDICATOR FOR GOLF PRACTICE
Filed Aug. 15, 1955     3 Sheets—Sheet 1
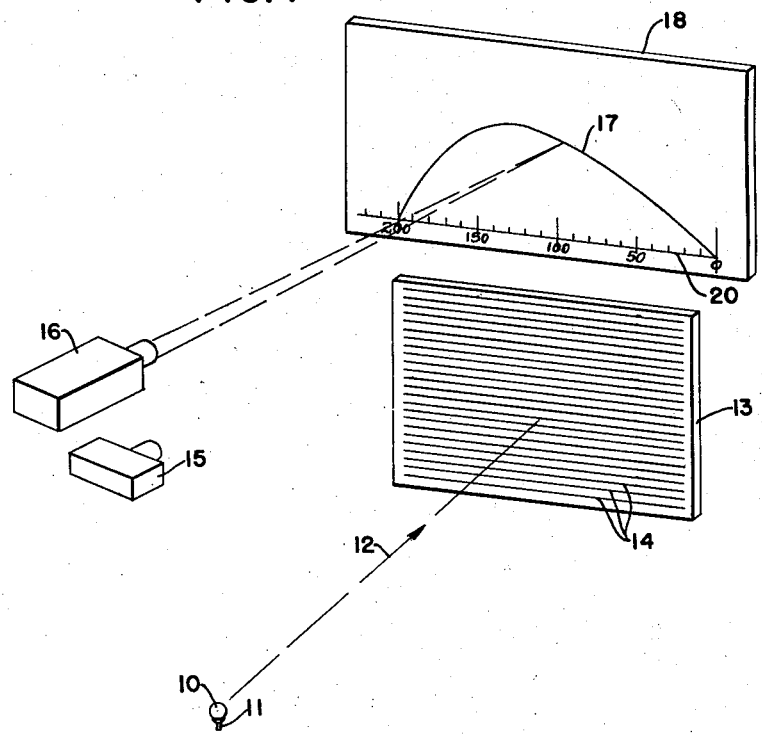
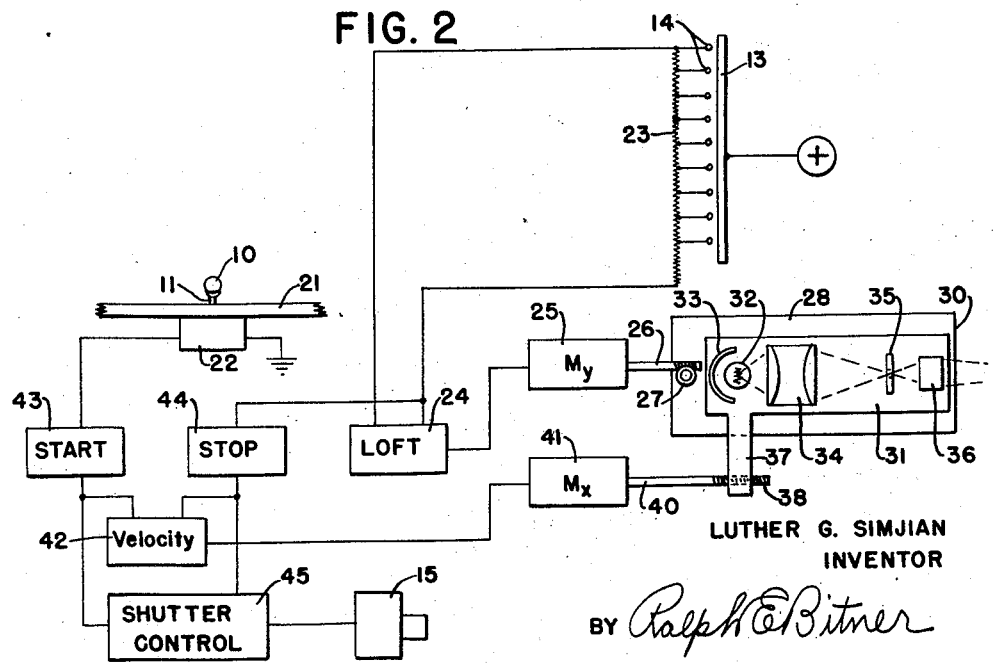
LUTHER G. SIMJIAN
INVENTOR
BY Ralph E. Bitner
ATTORNEY

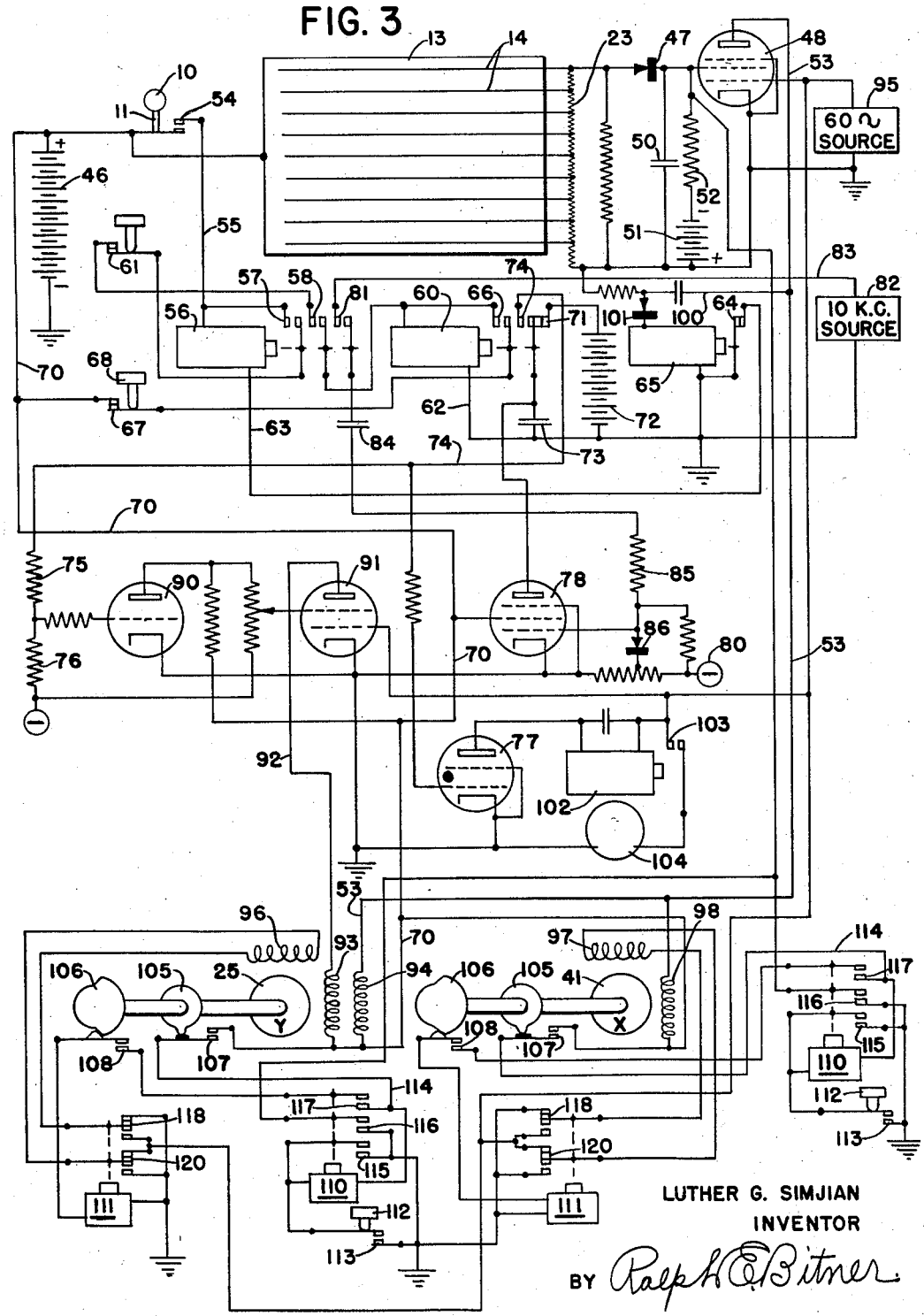

July 14, 1959 L. G. SIMJIAN 2,894,753
INDICATOR FOR GOLF PRACTICE
Filed Aug. 15, 1955 3 Sheets-Sheet 3
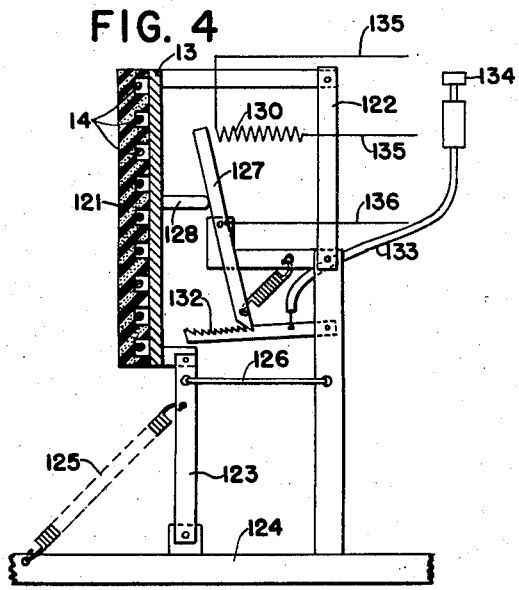
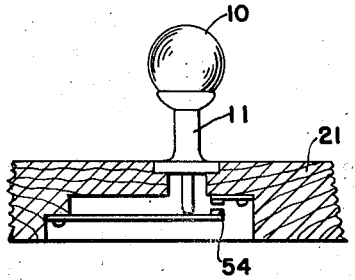
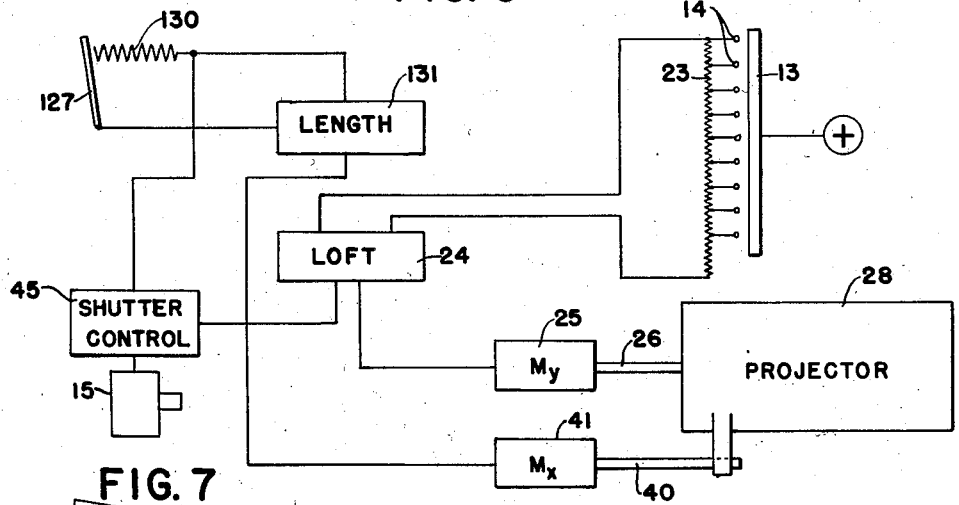
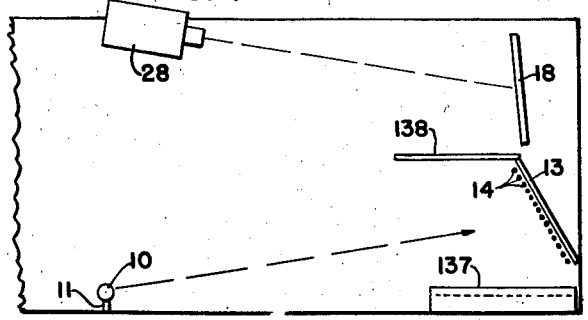
LUTHER G. SIMJIAN
INVENTOR
BY Ralph H. E. Bitner
ATTORNEY

United States Patent Office 2,894,753
Patented July 14, 1959

2,894,753

INDICATOR FOR GOLF PRACTICE

Luther G. Simjian, Greenwich, Conn., assignor to The Reflectone Corporation, Stamford, Conn., a corporation of Connecticut Application August 15, 1955, Serial No. 528,349

8 Claims. (Cl. 273—185)

This invention relates to a golf game in which a player may drive a golf ball against a target and then view the trajectory that the ball would have taken in free flight. The invention also has reference to means for indicating the length of drive and means for permanently recording the trajectory on a photographic film.

Several devices have been used to measure the approximate velocity of a free ball which has been struck with a club or bat. Some of these devices have been used for developing driving proficiency by employing a golf ball and using golf clubs. However, these prior art devices measured only the total force given to the ball and they did not determine nor show the height of the ball in its free flight nor show the ball's trajectory.

One of the objects of this invention is to provide an improved golf game for struck missiles which avoids one or more of the disadvantages and limitations of prior art arrangements.

Another object of the invention is to increase the accuracy of velocity measuring systems so that an accurate prediction can be made in regard to the missile's final position.

Another object of the invention is to measure the time interval between two positions at the start of the trajectory in order to determine the initial velocity and the total length of drive.

Another object of the invention is to reduce the cost of computing systems which determine the trajectory of a struck ball.

Another object of the invention is to determine the trajectory of a free ball not held captive by force-measuring coupling arrangements.

One feature of the invention includes a means for measuring the velocity of a struck ball within a restricted path and target means for measuring the height of the ball within this restricted path. A projection means which is controlled by the velocity and height information shows a trajectory display of the ball in free flight.

For a better understanding of the present invention together with other and further objects thereof, reference is made to the following description taken in connection with the accompanying drawings.

Fig. 1 is a perspective view showing the target, the projector, the screen which shows the trajectory, and the camera.

Fig. 2 is a schematic diagram of connections of the entire system showing most of the circuits in block form.

Fig. 3 is a schematic diagram of connections of the computing system showing the circuits in detail.

Fig. 4 is a side view, with some parts in section, showing an alternate arrangement for determining the total length of drive.

Fig. 5 is a cross sectional view of the tee employed in Figs. 1, 2, and 3, and indicating the contacts which signal the start of the trajectory.

Fig. 6 is a schematic diagram of connections similar to Fig. 2 but showing the circuit arrangement which is employed when the alternate target of Fig. 4 is used.

Fig. 7 is a schematic drawing indicating a preferred arrangement of the target, screen, and tee.

Referring now to Fig. 1 a ball 10 is positioned on a tee 11 and is in position for driving in the general direction indicated by arrow 12 toward a target 13 which contains a plurality of target conductors 14. A very short time interval after the drive has been made a camera 15 has its shutter open and a projector 16 is moved to show the approximate trajectory 17 on a screen 18 which may conveniently be placed directly above the target 13 but which may be positioned in any other desirable place. Near the bottom of the screen a scale 20 is drawn, calibrated in yards or any other convenient unit of length which indicates to the player the total length of drive his ball would have taken in free flight.

The circuit diagram in Fig. 2 shows the ball 10 supported by the tee 11 on a base 21. Directly under the tee 11 is a switch 22 which is closed when the ball is driven from the start position. Details of this switch are shown in Fig. 5. Target wires 14 are connected by a voltage divider 23 and are mounted in parallel arrangement adjacent to conducting plate 13 so that contact will be made between one of the target wires and the plate when a ball is driven into contact with the target. A covering of resilient material such as sponge rubber or felt may be added to the target in order to reduce the bounce of the ball when the apparatus is installed in a small room. Such a covering is shown in Fig. 4. Whenever a wire 14 is driven against plate 13 a signal is sent to a loft circuit 24 which determines the approximate height the ball would have taken in free flight and sends this information to a motor 25 which turns a shaft 26 and moves a nut 27 to raise a spot of light on screen 18 to show the approximate trajectory of the ball. The projector includes a base 28 which is hinged at edge 30 so that when nut 27 is turned, the spot of light will move up or down on the screen. A sub-base 31 contains all the optical components which include a lamp 32, a reflector 33, a condensing lens system 34, a diaphragm 35 and a projection lens 36. The sub-base 31 is pivoted about a vertical pivot installed under the lamp 32 and is moved by means of an arm 37 which contains a threaded portion engaged by a screw 38 on the end of a shaft 40 which is secured to a motor 41. The movements of motor 41 are controlled by a velocity determining circuit 42 which receives information from a start circuit 43 and a stop circuit 44. The start circuit 43 is controlled by switch 22 and sends information to the velocity circuit 42 as soon as the ball 10 is driven from the tee 11. The stop circuit 44 is connected to one of the conductors associated with the target voltage divider 23 and sends information to the velocity circuit as soon as the ball causes a connection to be made between any one of the target wires 14 and the base plate 13. The velocity circuit therefore, after receiving the start and stop voltage pulses determines the approximate length of drive and controls the motor 41 to turn the sub-base 31 to indicate that distance. In order to control the camera 15 to open and close at the right times, a shutter control circuit 45 is connected to the start circuit 43 and the stop circuit 44 and opens the shutter for the duration of the movement of the spot on screen 18. A similar projection system has been described in the U.S. patent application, Serial No. 303,634, filed August 9, 1952, now U.S. Patent 2,737,393, issued March 6, 1956.

Referring now specifically to Fig. 3 the target plate 13 is connected to the positive terminal of a source of potential 46, the negative terminal of which is connected to ground. The upper end of voltage divider 23 is connected in series with a rectifier unit 47 and the second grid of a pentode electron discharge device 48. A chargeable capacitor 50 is connected between the rectifier 47 and ground so that when one of the wires 14 is driven against plate 13 a positive charge, proportional to the height of contact, will be delivered to the capacitor and change the voltage of the second grid. A bias circuit which includes a battery 51 and a resistor 52 normally maintains the second grid below its cut-off value so that tube 48 does not pass current between its anode and cathode, but as soon as a charge is delivered to capacitor 50 the tube 48 is made conducting and current is delivered over conductor 53.

When the ball 10 is driven from tee 11 contacts 54 are closed, thereby sending the current from the source of potential 46 through the contacts over conductor 55 to a relay 56 which closes three contacts. The first pair of contacts 57 is in series with a locking circuit which will be described later. The second set of contacts 58 is in series with the winding of a second relay 60 and when contacts 58 are closed relay 60 is actuated by means of a circuit which can be traced from the positive terminal of the source of potential 46 through closed contacts 54, over conductor 55, through contacts 57, through a pair of normally closed reset contacts 61, through contacts 58, through the winding of relay 60, to conductor 62 and ground. When contacts 54 are closed the actuating circuit which causes relay 56 to remain in its actuated condition may be traced from the positive terminal as before, through contacts 54 which remain closed, through the winding of relay 56 over conductor 63 to contacts 64 of a third relay 65, and to ground. It is obvious that the first relay 56 will remain in its actuated condition until the third relay 65 is actuated and contacts 64 are opened.

When the second relay 60 is actuated contacts 66 are closed and a locking circuit holds this relay in its actuated condition until it is manually reset by opening contacts 67 operated by a reset button 68. The locking circuit may be traced from the positive source of potential over conductor 70, through contacts 67, through contacts 66, through the winding of relay 60, over conductor 62 to ground. When relay 60 was in its unactuated condition a set of contacts 71 applied a potential from battery 72 to a capacitor 73 and retained it in a charged condition until relay 60 was operated. When relay 60 is operated contacts 71 are opened and contacts 74 are closed, thereby applying the charge on capacitor 73 to conductor 74, voltage divider 75 and 76 and to the control electrode of gas-filled tube 77. Capacitor 73 is also connected to the anode of a pentode tube 78 which normally passes no current because its control electrode is biased to the cut-off point due to the negative terminal 80. The other side of voltage divider 75, 76, is joined to a negative terminal which is connected to a source of potential (not shown) maintaining this terminal at a potential below ground.

When the first relay 56 is actuated its third set of contacts 81 are closed and current from a 10 kilocycle source of alternating current potential 82 is sent over conductor 83, through the contacts 81, through blocking capacitor 84 in series with resistor 85, rectifier 86, and ground. This raises the potential of the control grid in pentode 78 so that it conducts and helps to discharge capacitor 73. Capacitor 73 discharges slowly through contacts 74 and voltage divider 75, 76 (after actuation of relay 60), but discharges much faster through the anode-cathode circuit of tube 78 which is in its discharge condition only for the duration of the actuation of relay 56 and the closing of contacts 81. The combination of these two discharge rates reduces the potential of capacitor 73 so that the duration of this discharge is proportional to the length of time the ball is in the air. A similar circuit has been described in U.S. patent application, Serial No. 369,435, filed July 21, 1953, by L. G. Simjian, now U.S. Patent 2,784,000, issued March 5, 1957.

When the second relay 60 is energized the current through contacts 74, and resistors 75 and 76, raises the voltage on the control electrode of triode 90 so that it conducts and transfers a charge to a tetrode 91 causing it to pass current through its anode-cathode circuit. Triode 90 is an inversion tube and presents reversed polarities to tetrode 91, therefore, while the current through tetrode 90 starts at a large value and slowly decreases to zero the current through tube 91 starts at a small value and increases to a large value. The current through the anode of tube 91 is transferred over a conductor 92 to a winding 93 on motor 25 which makes the motor run in a direction which moves the spot down on the screen (clockwise in Fig. 3). Current in winding 94 on the same motor is arranged so that it moves the spot up on the screen. Current for winding 94 is obtained over conductor 53 from the anode of pentode 48 and is a direct current modulated by a source 95 of 60 cycle alternating current. The result of these combined actions is: The spot moves up on the screen due to the charge on capacitor 50 and the current through conductor 53. As the charge leaks off capacitor 50, the upward vertical velocity slowly decreases until the current through tube 91 stops this motion and reverses the direction of movement. Motor 25 contains another winding 96 which is connected to source 95 and is available at all times when the equipment is in use.

The horizontal motion of the projected spot is obtained by means of motor 41 which includes an alternating current winding 97 and an operating winding 98 which receives its current by way of conductor 53 and pentode 48. Motor 41 has only one operating winding whose current is directly proportional to the amount of charge on capacitor 50. For this reason the motion of the spot in a horizontal direction at first has considerable velocity and then decreases to a small value as the spot is lowered to the ground level.

The third relay 65 is controlled by the start of current through tube 48 which is made conductive as soon as the ball hits the target. When this event occurs current over conductor 53 and conductor 100 is rectified by rectifier 101, operating the relay 65 and opening contacts 64 thereby opening the locking circuit of the first relay 56 and breaking contacts 81 and thereby placing pentode 78 in a non-conducting condition and cutting off the current through the gas tube 77. Gas tube 77 supplies current through its anode circuit to a fourth relay 102 which is conductive for the duration of the flight of the ball. Relay 102 includes normally open contacts 103 the closure of which denotes the duration of flight. A shutter control means 104 is connected in series between contacts 103 and ground. This control means may be an alternating current solenoid or any other type of transducer which converts alternating current to mechanical motion which can be supplied to a shutter on camera 15 to control the exposure.

After motors 25 and 41 have turned the controls which move the projected spot through its calculated trajectory, the main operation is concluded and the machine must be reset to accommodate another flight. The ball 10 is first placed on the tee 11 breaking contacts 54. Then reset contacts 61 and 67 are opened, normalizing relays 56 and 60. In order to return the motors to their original position two cams 105 and 106 are secured to the shaft of each motor. Cam 105 operates contacts 107 and opens them when the motor is in its neutral or start position. Cam 106 operates contacts 108 and closes them when the motor has turned in a clock-wise motion and leaves them open when turned in the other direction. A normalizing relay 110 includes three contacts which are normally open and operates to provide current through one of the motor windings to turn the motor back to its initial position. Another relay 111 acts as a reversing switch and determines the direction of rotation of the motor when moving toward its zero position. The reset action of the motors is controlled by buttons 112 which are manually depressed to close contacts 113. When these contacts are closed current is received from the positive terminal of source of potential 46 over conductor 70, through contacts 107 which have been closed because of the rotation of cam 105, over conductor 114, through the winding of relay 110, contacts 113, and ground. This actuation closes all three contacts, locking contacts 115 hold the relay in its actuated condition until contacts 107 are opened, contacts 116 place ground potential on the second grid of pentode 48 thereby making it conducting and sending modulated current over conductor 53 to winding 94 to turn the motor to the zero position. Contacts 117 operate only when contacts 108 are closed and then current is sent from the positive source of potential through contacts 108 and the winding of relay 111 operating contacts 118 and 120 to reverse the direction of current through winding 96 and cause the motor to turn in the reverse direction. Motor 25 will, in most cases, end the operation by returning to its zero position, ending the trajectory 17 at ground level. In this instance contacts 107 are open, relay winding 110 receives no current, and there is no resetting action. If, however, the projector 16 is stopped a short distance above the ground line, contacts 107 and 108 remain closed, the reversing relay 111 is actuated to change the phase of the current in winding 96, and the current in winding 94 which normally moves the spot up will now move it down to its zero position. A similar motor reset circuit is shown and described in U.S. patent application, Serial No. 412,436, filed February 25, 1954, by L. G. Simjian, now U.S. Patent 2,783,999 issued March 5, 1957.

The target shown in Fig. 4 comprises a back plate 13, wires 14, and a sponge rubber covering 121, the sponge rubber acting to absorb the energy of the ball. The target assembly is mounted on links 122 and 123, each of which is pivoted to a bracket which is secured to a base plate 124 and both links are held in normal position by a coil spring 125 acting against a flexible cord stop 126, the spring and stop being connected to link 123. Directly behind the target is a pivoted contact arm 127 which is engaged by a portion 128 of the target and is moved to the rear when the target is moved. A sliding contact resistor 130 is mounted so as to engage the arm 127 and make contact with it. The lower portion of arm 127 fits into a ratchet bar 132 which is pivoted on a portion of the frame. The ratchet bar may be disengaged from arm 127 by means of a Bowden wire 133 which is secured to a spring pressed reset button 134.

The operation of this target is as follows: When the ball is struck from the tee and strikes covering 121, the target is moved to the rear an amount which is proportional to the force of the blow and to the distance the ball will travel in free flight. The target movement moves arm 127 to the rear along resistor 130 and latches it in this position because of latch arm 132. Resistor 130 is connected by conductors 135 and 136 to the terminals of capacitor 73 (see Fig. 3) and the value of resistance remaining in resistor 130 determines the rate at which the capacitor is discharged. When such a target is employed it is unnecessary to have circuit contacts operated by the tee.

The block diagram shown in Fig. 6 is similar to that shown in Fig. 2 except that it uses the alternate type of target and employs circuits adapted to this target. The projector shown in Fig. 6 is the same as that shown in Fig. 2 as are also motors 25 and 41. The shutter control circuit 45 is connected to one end of resistor 130 instead of switch 22 under the tee and instead of the velocity circuit 42 a simple control circuit 131 is employed. One type of such a control circuit is shown and described in U.S. patent application, Serial No. 303,634, filed August 9, 1952, by L. G. Simjian, now U.S. Patent 2,737,393, issued March 6, 1956.

The schematic diagram shown in Fig. 7 illustrates a preferred form of arrangement of the main components. The target 13, 14 is mounted at an angle to the vertical so that balls driven from the tee 11 will be deflected into a sand pit 137 after bouncing from the target. The projector 28 is mounted on the ceiling and projects the image of the ball on screen 18 mounted directly over the target and protected by a partition 138.

While there have been described and illustrated specific embodiments of the invention, it will be obvious that various changes and modifications may be made therein without departing from the field of the invention which should be limited only by the scope of the appended claims.

I claim:

1. A means for showing the motion of a missile comprising; a signal generating means which produces a primary electrical signal responsive to the displacement of a missile from a starting position; a target disposed for receiving and impeding further forward motion of the missile; said target including a single array of sensing means which produces a secondary electrical signal responsive to the impact height of the missile on the target; electrical computing means which receive the primary and secondary signals and produce output signals proportional to the velocity of the missile and to the height the missile would have traveled in free space; a display device having means for receiving said output signals and for causing said display device to show a path of said missile in free flight in response to said output signals, and said path being a curve of said missile in free flight as viewed laterally to the path of the missile.

2. A means for showing the motion of a missile comprising; a signal generating means which produces a primary electrical signal responsive to the displacement of a missile from a starting position; a target disposed for receiving and impeding further forward motion of the missile; said target including a single array of sensing means which produces a secondary electrical signal whose amplitude is proportional to the impact height of the missile on the target; electrical computing means which receive the primary and secondary signals and produce output signals proportional to the velocity of the missile and to the height the missile would have traveled in free space; an optical projector equipped with motive means which receive said output signals and cause said projector to show on a viewing screen a path of the missile in free flight, said path being a curve of said missile in free flight as viewed laterally to the path of the missile.

3. A means for showing the motion of a missile comprising; electrical contact means adjacent to a missile starting position for actuation by the displacement of the missile and causing a primary signal upon being actuated; a target disposed for receiving and impeding further forward motion of the missile; said target including a single array of electrical contact means for actuation by the missile's impact; said contact means causing a secondary electrical signal whose amplitude is proportional to the impact height of the missile on the target; electrical computing means which receive said primary and secondary signals and produce output signals proportional to the velocity of the missile and to the height the missile would have traveled in free space; an optical projector equipped with motive means which receive said output signals and cause said projector to show on a viewing screen a path of the missile in free flight, said path being a curve of said missile in free flight as viewed laterally to the path of the missile.

4. A means for showing the motion of a missile comprising; a signal generating means which produces a primary electrical signal responsive to the displacement of a missile from a starting position; a target disposed for receiving and impeding further forward motion of the missile; said target including a single array of sensing means which produces a secondary electrical signal responsive to the impact height of the missile on the target; electrical computing means which receive the primary and secondary signals and produce output signals proportional to the velocity of the missile and to the height the missile would have traveled in free space; a display device equipped with and operated by a first and a second motor; said first motor receiving the output signal responsive to the missile's velocity and the second motor receiving the output signal responsive to the missile's height, both motors thereby causing said display device to show a path of said missile in free flight as viewed laterally to the path of the missile.

5. A means for showing the motion of a missile as set forth in claim 4 wherein a photographic recording means is aimed at the display produced by said display device and including means for actuating said recording means during the operation of said display device to render an analyzable record of the path produced by said display device.

6. A means for showing the motion of a missile as set forth in claim 4 wherein said output signals include a first voltage pulse whose amplitude and duration are proportional to the velocity of the missile and a second voltage pulse whose amplitude and duration are proportional to the height the missile would have traveled in free space.

7. A means for showing the motion of a missile comprising; a generating means which produces a primary signal responsive to the displacement of a missile from a starting position; a target disposed for receiving and impeding further forward motion of the missile; said target including a single array of sensing means which produces a secondary signal responsive to the impact height of the missile on the target; computing means which receive the primary and secondary signals and produce output signals proportional to the velocity of the missile and to the height of the missile would have traveled in free space; and a display device equipped with means causing display motion along two perpendicular axes; said motion causing means receiving said output signals and causing said display device to show a path of said missile in free flight as viewed laterally to the path of the missile.

8. A means for showing the motion of a missile in accordance with claim 7 wherein, the magnitude of the secondary signal is proportional to the impact height of the missile on the target, and the output signal proportional to the missile's velocity is computed from the elapsed time between the primary and secondary signals.

References Cited in the file of this patent
UNITED STATES PATENTS
2,581,738   Williams _____ Jan. 8, 1952